(No Model.)
J. P. WEST.
WEIGHING SCALE.
No. 446,309. Patented Feb. 10, 1891.
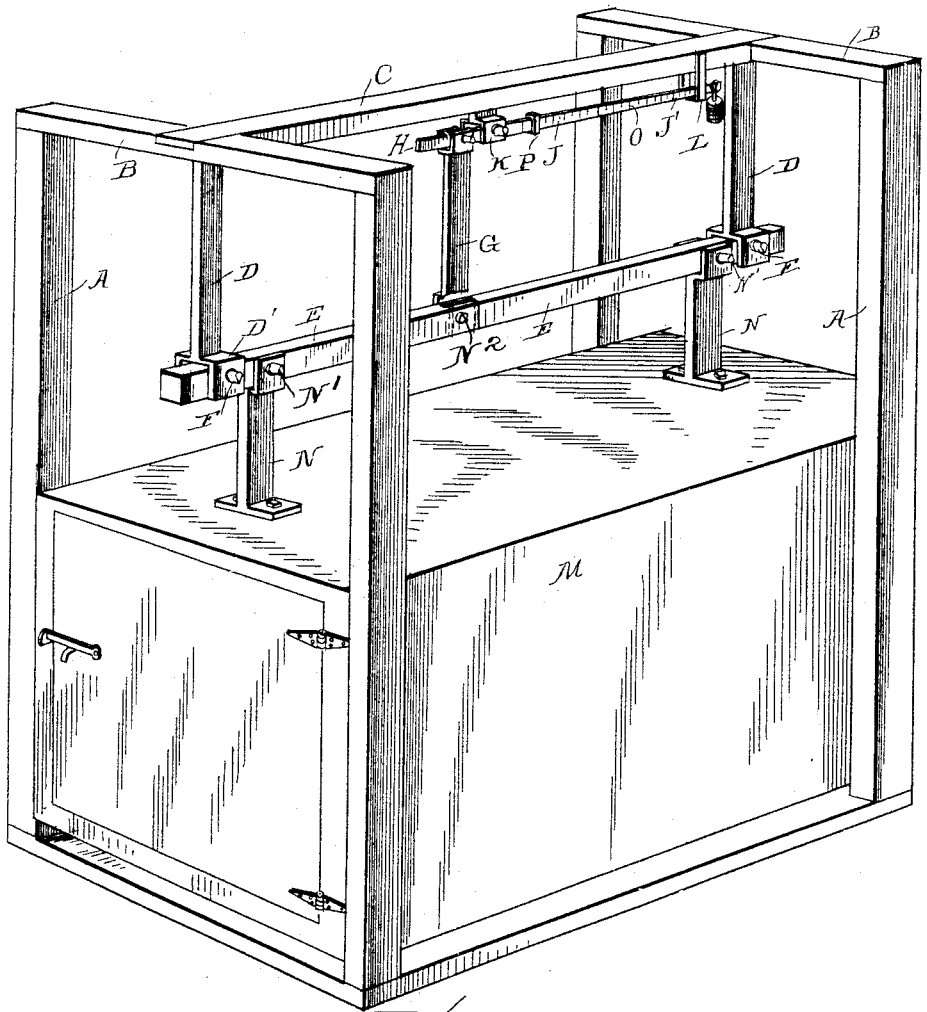
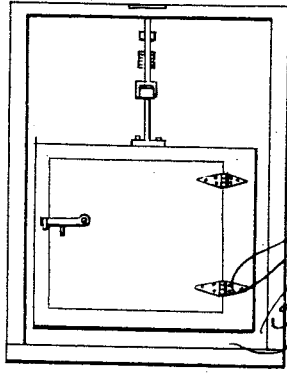
WITNESSES
A. J. Schwartz
A. E. Grant
INVENTOR
J. P. West
By W. Fitzgerald
Attorney
THE NORRIS PETERS CO., PHOTO-LITHO., WASHINGTON, D. C.

UNITED STATES PATENT OFFICE.

JOHN PATRICK WEST, OF OSGOOD, MISSOURI.

WEIGHING-SCALE.

SPECIFICATION forming part of Letters Patent No. 446,309, dated February 10, 1891.

Application filed June 23, 1890. Serial No. 356,458. (No model.)

*To all whom it may concern:*

Be it known that I, JOHN PATRICK WEST, a citizen of the United States, residing at Osgood, in the county of Sullivan and State of Missouri, have invented certain new and useful Improvements in Scales; and I do hereby declare the following to be a full, clear, and exact description of the invention, such as will enable others skilled in the art to which it appertains to make and use the same.

My invention consists in a new and improved scale which is more especially adapted for weighing live stock, and in which I combine great simplicity and cheapness of construction with thorough efficiency in operation; and my invention will be hereinafter fully described and claimed.

Referring to the accompanying drawings, Figure 1 is a perspective side view of my new and improved scale, and Fig. 2 is an end view of the same.

The same letters of reference indicate corresponding parts in both the figures.

Referring to the several parts by letter, A A indicate four vertical end posts, which may be six feet or any desired height. The upper ends of the end posts are connected by cross-pieces B, and upon the middle of these cross-pieces rest and are secured the ends of the upper beam C of the scale. Near each end of this top beam C are rigidly secured to the beam hangers D D, having the bifurcated lower ends D'. E E indicate two separate supporting-beams, the outer ends of which are pivoted on knife-edge bearings F in the bifurcated lower ends D' of the hangers D, while their inner ends are pivoted together and connected by a hanger G with the end of the short arm H of the weighing-beam J, which is supported in a bearing K beneath the under side of the top beam C. The free end of the long arm J' of the counting-beam plays in a keeper L.

The weight-box, platform, or other suitable receptacle M for the object to be weighed is pivotally connected by means of hangers N to the outer ends of the supporting-beams E E at a determined distance from their pivotal points F. It will now be seen that if the distance from the outer pivotal point F to the inner pivotal point $N^2$ of each supporting-beam E is forty-eight inches and the distance from the outer pivotal point F to the point N', where the weight-box is pivoted to the supporting-beam, is three inches one-sixteenth of the weight will reach the weighing-beam, and by the arrangement of the scale O on the weighing-beam and the poise P thereon the weight can be readily determined. The pivot-bearings between all the suspended parts are knife-edge bearings, to reduce friction to the minimum.

From the foregoing description, taken in connection with the accompanying drawings, the construction, operation, and advantages of my invention will be readily understood. It will be seen that my new and improved scale, which can be made largely of wood, is exceedingly simple, strong, and durable, and cheap in construction; that it can be manufactured and put on the market at a very reasonable cost, and that it is very efficient and accurate in its operation.

Having thus described my invention, what I claim, and desire to secure by Letters Patent, is—

The combination, in a scale, of the end posts A, the connecting cross-bars B, the top beam C, supported at its ends on the center of the cross-bars B, and having the hangers D and bearing K, the pivoted supporting-beams E, the pivoted weighing-beam J, the connecting-hanger G, the receptacle M, and its connecting-hangers N, substantially as set forth.

In testimony whereof I affix my signature in presence of two witnesses.

JOHN PATRICK WEST.

Witnesses:
D. N. CROUCH,
R. D. ROACH.